United States Patent
Zhou et al.

(10) Patent No.: US 11,159,866 B2
(45) Date of Patent: Oct. 26, 2021

(54) ELECTRONIC DEVICE FOR DISPLAYING AND SOUND-GENERATING AND LASER TELEVISION

(71) Applicant: HISENSE VISUAL TECHNOLOGY CO., LTD., Qingdao (CN)

(72) Inventors: Hui Zhou, Qingdao (CN); Jianxin Yang, Qingdao (CN); Yingrui Wang, Qingdao (CN); Jian Zhang, Qingdao (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 16/848,868

(22) Filed: Apr. 15, 2020

(65) Prior Publication Data
US 2021/0127187 A1     Apr. 29, 2021

Related U.S. Application Data

(63) Continuation of application No. PCT/CN2020/075957, filed on Feb. 20, 2020.

(30) Foreign Application Priority Data

Oct. 23, 2019   (CN) .......................... 201911014070.1
Oct. 23, 2019   (CN) .......................... 201921788386.1

(51) Int. Cl.
   *H04R 1/02*     (2006.01)
   *H04N 9/31*    (2006.01)

(52) U.S. Cl.
   CPC ........... *H04R 1/028* (2013.01); *H04N 9/3141* (2013.01); *H04R 2499/15* (2013.01)

(58) Field of Classification Search
   None
   See application file for complete search history.

(56) References Cited

U.S. PATENT DOCUMENTS

2014/0063600 A1*   3/2014   Sharp .................... G02B 27/48
                                                              359/446

FOREIGN PATENT DOCUMENTS

| CN | 101233785 A | 7/2008 |
|---|---|---|
| CN | 108462917 A | 8/2018 |
| CN | 108873588 A | 11/2018 |
| CN | 109256070 A | 1/2019 |
| JP | 2011147093 A | 7/2011 |
| WO | WO2006117044 | 11/2006 |

OTHER PUBLICATIONS

English translation of CN108462917A (Year: 2018).*
English translation of CN108873588A (Year: 2018).*
International Search Report for PCT/CN2020/075957.

* cited by examiner

*Primary Examiner* — James K Mooney
(74) *Attorney, Agent, or Firm* — J.C. Patents (57) ABSTRACT

The present application provides an electronic device. After a display screen of the electronic device is attached to a screen frame, the display screen extends beyond the screen frame at at least two opposite edges and extends toward the second side of the display screen by taking the screen frame as an axis, and then the display screen is mounted by a mounting structure connected with the screen frame, so that the display screen is kept flat by a tensile force provided to the display screen via the mounting structure.

9 Claims, 7 Drawing Sheets

ELECTRONIC DEVICE FOR DISPLAYING AND SOUND-GENERATING AND LASER TELEVISION

CROSS-REFERENCE TO RELATED APPLICATIONS

The present patent application is a continuation of International Application No. PCT/CN2020/075957, filed on Feb. 20, 2020, which claims priority to Chinese Patent Application No. 201911014070.1 filed on Oct. 23, 2019 and Chinese Patent Application No. 201921788386.1 filed on Oct. 23, 2019. The contents of all of the aforementioned applications are hereby incorporated by reference in their entireties.

TECHNICAL FIELD

The present application relates to the field of electronic technologies and, in particular, to an electronic device.

BACKGROUND

Currently, with the continuous development of electronic technology, a display screen of an electronic device, such as a television, a computer and the like, may have a function of generating sound itself in addition to the conventional display function, so that it is not necessary to leave space for mounting a loudspeaker inside the electronic device any more, which contributes to achieving a lighter and thinner design of the electronic device. In order to achieve the sound generation of the display screen, an electromagnetic driver would be disposed on the non-display side of the display screen in the electronic device, so as to make the display screen generate sound by emitting flexural waves through mode resonance under driving of the electromagnetic driver. However, it is not difficult to understand that the display screen having a higher strength is more likely to maintain flat and resist deformation, while in order to make the display screen capable of generating sound via vibration and achieving a good acoustic performance, materials for fabricating the display screen are required to be light and thin, and a sound generating substrate for holding an optical film in the display screen shall not have an excessively large thickness or an excessively high bending strength. Thus, for the display screen, the vibration sound-generating performance and the strength required for maintaining flat have conflicts.

In the related art, a frame structure is generally used around the display screen in the electronic device for wrapping the edges of the display screen to achieve relative mounting position of the display screen. However, as the electronic devices having a large-size display screen with ultrashort focus projection, such as laser projection televisions and the like, are gradually brought into the market and requirements for flatness of the screen with ultrashort focus laser projection are relatively high, when the screen has a relatively large size, the display screen with the existing wrapping-type mounting structure is unable to maintain flat by completely depending on its intrinsic rigidity. Especially, the display screen formed by multilayer composite materials and having a smaller thickness is likely to be affected by the temperature and humidity of the environment and become uneven or warped, resulting in a geometric distortion of images displayed on the laser projection screen.

Thus, how to keep the sound-generating display screen of the electronic device flat to avoid the geometric distortion of images displayed on the display screen while having a good acoustic sound-generating performance is a technical problem that needs to be solved urgently in the field.

SUMMARY

The present application provides an electronic device and a display module to solve the technical problem in the related art that the display screen of the electronic device is unable to keep flat, which causes a geometric distortion of displayed images.

Some embodiments of the present application provide an electronic device, including:

a host, configured to project light to a display screen and send an electrical signal to at least one electromagnetic driver;

the display screen, configured to receive the light projected from the host and display an image on a first side of the display screen according to the light;

the at least one electromagnetic driver, disposed on a second side of the display screen, and configured to receive the electrical signal sent from the host and drive the display screen to generate sound via vibration according to the electrical signal;

a screen frame, attached to edges of the second side of the display screen, and configured to hold the display screen; where the display screen extends beyond the screen frame at at least two opposite edges and extends toward the second side of the display screen; and at least one mounting structure, disposed on the second side of the display screen; where the mounting structure has a first end connected with the screen frame and a second end connected with the display screen extending toward the second side, and is configured to keep the display screen flat.

In some embodiments of the present application, the mounting structure is configured to keep the display screen flat by providing a tension to the display screen.

In some embodiments of the present application, the display screen includes: a sound-generating substrate and a display structure, where the sound-generating substrate is attached to the display structure, and the at least one electromagnetic driver is disposed on one side of the sound-generating substrate;

the sound-generating substrate includes: a first skin, a second skin and a middle layer; where the first skin and the second skin are attached to two sides of the middle layer, respectively;

the first skin and/or the second skin of the sound-generating substrate extend beyond the screen frame at at least two opposite edges and extend toward the second side of the display screen; the second end of the mounting structure is connected with the first skin and/or the second skin of the sound-generating substrate extending toward the second side.

In some embodiments of the present application, the first skin and the second skin are made of polymer material.

In some embodiments of the present application, the polymer material includes: polyurethane or polystyrene.

In some embodiments of the present application, at least one opening is disposed on the first skin and/or the second skin of the sound-generating substrate extending toward the second side, and the at least one opening has one-to-one correspondence with the at least one mounting structure;

a hollow rivet is disposed on one of the at least one opening, and the second end of the at least one mounting structure is connected with the hollow rivet disposed on one of the at least one opening.

In some embodiments of the present application, the mounting structure includes: a tension spring.

In some embodiments of the present application, an elastic coefficient of a tension spring connected to an upper edge of the display screen is larger than an elastic coefficient of a tension spring connected to a lower edge of the display screen.

In some embodiments of the present application, the electronic device also includes:

at least two connection cloths, in connection with the at least two opposite edges of the display screen accordingly;

where the display screen extends beyond the screen frame at the at least two opposite edges and extends toward the second side of the display screen, via the at least two connection cloths which have one-to-one correspondence with the at least two opposite edges.

In some embodiments of the present application, the electronic device also includes: at least one supporting rod which has one-to-one correspondence with the at least two connection cloths, where corresponding supporting rods are threaded through the at least two connection cloths, respectively, when extending toward the second side of the display screen;

the at least one mounting structure includes: at least one mounting structure corresponding to the at least one supporting rod; the first end of the at least one mounting structure corresponding to the at least one supporting rod is connected with the screen frame, and the second end is connected with one of the at least one supporting rod; the at least one mounting structure corresponding to the at least one supporting rod is configured to keep the display screen flat by providing a tension to the display screen via the at least one supporting rod.

Embodiments of the present application provide an electronic device, including: a display screen including a first side configured to display an image; at least one electromagnetic driver, disposed on a second side of the display screen, and configured to drive the display screen to generate sound via vibration; a screen frame, attached to edges of the second side of the display screen, and configured to hold the display screen, where the display screen extends beyond the screen frame at at least two opposite edges and extends toward the second side of the display screen; and at least one mounting structure, disposed on the second side of the display screen, where the mounting structure has a first end connected with the screen frame and a second end connected with the display screen extending toward the second side, and is configured to keep the display screen flat.

Embodiments of the present application also provide another electronic device, including: a display screen including a first side configured to display an image; at least one electromagnetic driver, disposed on a second side of the display screen, and configured to drive the display screen to generate sound via vibration; a screen frame, configured to hold the display screen; at least two connection cloths, having one-to-one connection with at least two opposite edges of the display screen; where the display screen extends beyond the screen frame at the at least two opposite edges and extends toward the second side of the display screen, via the at least two connection cloths having one-to-one connection with the at least two opposite edges.

Embodiments of the present application also provide a laser television, including: a box, configured to send projection light; a display screen, configured to receive the projection light and display an image on the display screen; and at least one electromagnetic driver, configured to drive the display screen to generate sound via vibration.

In some embodiments, the laser television also includes: a screen frame, disposed on edges of the display screen, and configured to hold the display screen; at least one mounting structure, having a first end connected with the screen frame and a second end connected with the display screen that extends, and configured to keep the display screen flat.

In some embodiments, a first side of the display screen is configured to display the image, and the display screen extends beyond the screen frame at at least two opposite edges and extends toward a second side of the display screen; and the at least one mounting structure is disposed on the second side of the display screen.

In some embodiments, the mounting structure is configured to keep the display screen flat by providing a tension to the display screen.

In some embodiments, the display screen includes: a sound-generating substrate and a display structure, where the sound-generating substrate is attached to the display structure, and the at least one electromagnetic driver is disposed on one side of the sound-generating substrate; the sound-generating substrate includes: a first skin, a second skin and a middle layer; the first skin and the second skin are attached to two sides of the middle layer, respectively.

In some embodiments, the first skin and/or the second skin of the sound-generating substrate extend beyond the screen frame at at least two opposite edges and extend toward the second side of the display screen; the second end of the mounting structure is connected with the first skin and/or the second skin of the sound-generating substrate extending toward the second side.

In some embodiments, at least one opening is disposed on the first skin and/or the second skin of the sound-generating substrate extending toward the second side, and the at least one opening has one-to-one correspondence with the at least one mounting structure; a hollow rivet is disposed on one of the at least one opening, and the second end of the at least one mounting structure is connected with the hollow rivet disposed on one of the at least one opening.

In some embodiments, the mounting structure includes: a tension spring, and an elastic coefficient of a tension spring connected to an upper edge of the display screen is larger than an elastic coefficient of a tension spring connected to a lower edge of the display screen.

For those reasons, the present application provides an electronic device. After the display screen of the electronic device is attached to the screen frame, the display screen extends beyond the screen frame at at least two opposite edges and further extends toward the second side of the display screen by taking the screen frame as an axis, and then the display screen is mounted by the mounting structure connected with the screen frame. In this way, tensile forces in opposite directions are provided to the display screen at at least two opposite edges via the mounting structure connected with the part extending toward the second side, thereby the tension is provided to the surface of the first side of the display screen, and thus the display screen is kept flat by the tensile forces provided to the display screen via the mounting structure.

Especially for a sound-generating screen with ultrashort focus projection, the tension can be provided to the entire display screen, so as to avoid an irregular deformation of the display screen due to a concavity or a convexity of the entire display screen after an environment temperature change thanks to different thermal expansion coefficients of the multilayer materials of the display screen, thereby avoiding the geometric distortion of images displayed on the display screen under the ultrashort focus projection.

BRIEF DESCRIPTION OF DRAWING(S)

In order to illustrate the present application or the related art more clearly, the accompanying drawings required in the descriptions of the embodiments or the related art are simply described below. Obviously, the accompanying drawings in the descriptions below are some of the embodiments of the present application, and for those skilled in the prior art, other accompanying drawings can also be obtained according to these accompanying drawings without any creative effort.

DESCRIPTION OF EMBODIMENTS

Embodiments of the present application will be described clearly and completely below in combination with the accompanying drawings of embodiments of the present application. Obviously, the described embodiments are merely some, but not all, of the embodiments of the present application. Based on embodiments of the present application, all the other embodiments obtained by those skilled in the art without any creative effort shall fall within the protection scope of the present application.

The terms of "first", "second", "third", "fourth" and the like (if any) in the description, the claims and the above-described accompanying drawings are used to distinguish similar objects, but do not necessarily describe a specific sequence or a specific order. It should be understood that the terms used in this way can be interchanged in appropriate cases, so that the embodiments of the present application can be implemented in other sequence in addition to those illustrated or described herein. In addition, the terms "include" "have" and any other variations thereof are intended to cover a non-exclusive inclusion, for example, processes, methods, systems, products or devices which include a series of steps or units are not necessarily limited to those steps or units listed explicitly, but may include other steps or units that are not explicitly listed or that are inherent for these processes, methods, systems, products or devices.

Before a formal description of the present application, scenarios of the present application and the problems existing in the related art will be described in combination with the accompanying drawings.

Figure 1:
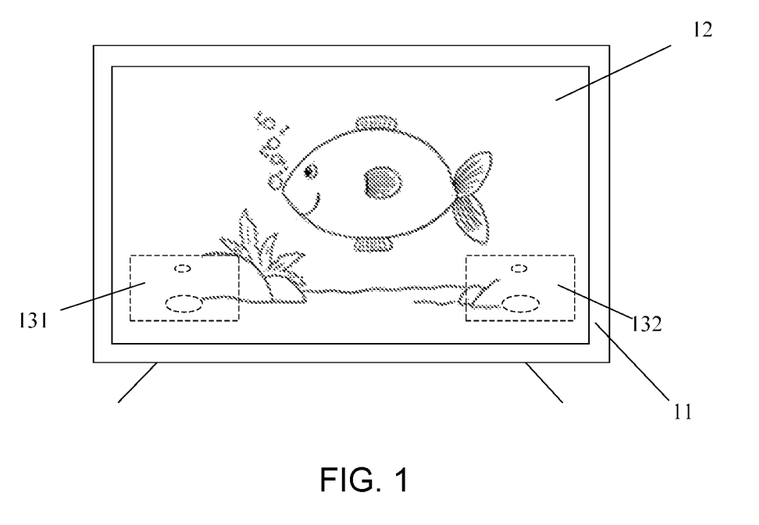
FIG. 1 is a schematic structural diagram of an electronic device.
Figure 2:
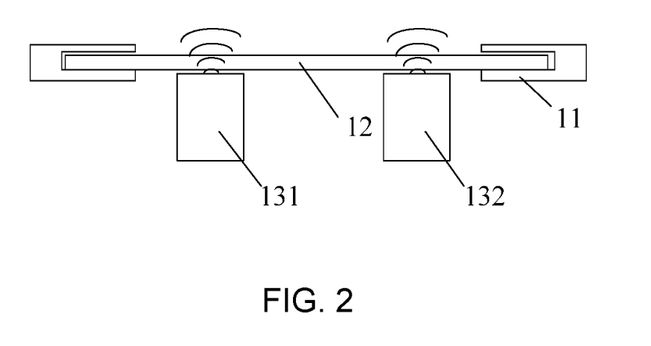
FIG. 2 is a schematic diagram of a sectional structure of an electronic device.

FIG. 1 is a schematic structural diagram of an electronic device, where a television is taken as an example of the electronic device. The electronic device includes: a screen frame 11, a display screen 12 and at least two loudspeakers (such as a left loudspeaker 131 and a right loudspeaker 132 as shown in FIG. 1). More specifically, FIG. 2 is a schematic diagram of a sectional structure of an electronic device. With reference to FIG. 1 and FIG. 2, the display screen is wrapped and mounted via the screen frame 11 of the television which is disposed around the display screen 12. Meanwhile, a display side of the display screen 12 is configured to display the content of images, and the left loudspeaker 131 and the right loudspeaker 132 are disposed in a non-display side of the display screen 12 and inside the electronic device. Generally, the left loudspeaker 131 and the right loudspeaker 132 are respectively disposed on the left and right side of the direction in which a user watches the display screen 12, so as to provide left channel sound and right channel sound.

With the gradual development of the electronic devices in the market in the direction of being lighter and thinner according to users' requirements and with continuous improvement of the electronic technology, key components, such as the display screen, the basic frame and the like, can be achieved in a relatively small thickness for more and more electronic devices, thereby the entire thickness of the electronic devices can be reduced. Therefore, for example inside the electronic device, except for disposing some components for displaying, remained space for the loudspeakers is getting smaller, thus, in some technique, the electronic devices have a "sound-generating screen". For example, referring to FIG. 3 and FIG. 4, FIG. 3 is a schematic structural diagram of another electronic device, and FIG. 4 is schematic diagram of a sectional structure of another electronic device.

A laser projection television is taken as an example of the electronic device. A host 10 is configured to project laser light to a display screen 12, so that the display screen 12 displays the content of images. Meanwhile, the host 10 can also send an electrical signal to an electromagnetic driver, so that the electromagnetic driver drives the display screen to generate sound via vibration. As shown in FIG. 3 and FIG. 4, in addition to wrapping and mounting the display screen 12 by a screen frame 11 in the electronic device, at least one electromagnetic driver (such as an electromagnetic driver 141 and an electromagnetic driver 142 as shown in the figures) is disposed on a non-display side of the display screen 12, so that the display screen 12 is capable of generating sound by emitting flexural waves through mode resonance under the driving of the electromagnetic drivers 141 and 142, in addition to displaying the content of the images. Therefore, with the sound-generating of the display screen, it is not necessary to leave a mounting space for a loudspeaker inside the electronic device any more, thereby achieving a lighter and thinner design of the electronic device.

Figure 3:
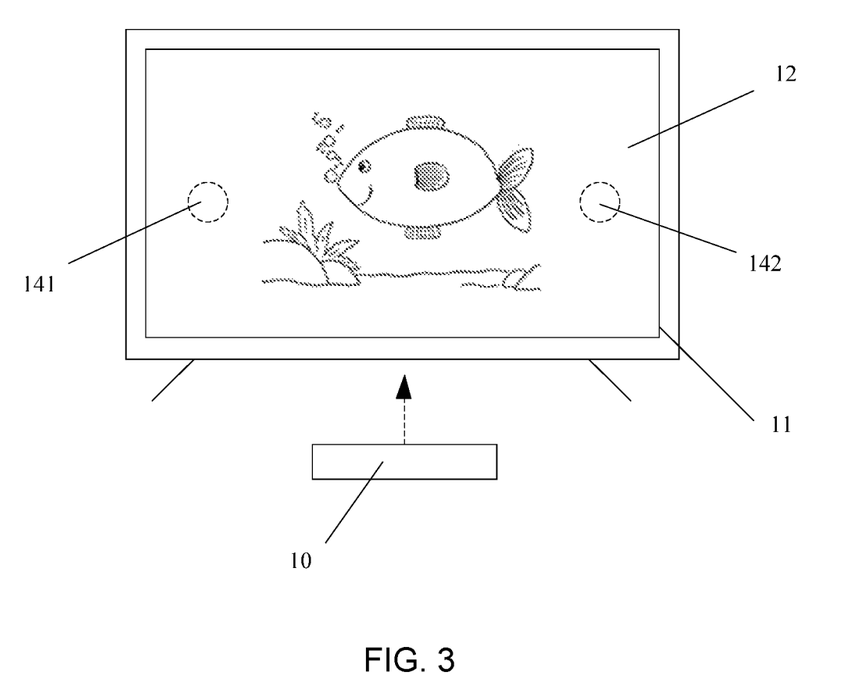
FIG. 3 is a schematic structural diagram of another electronic device.
Figure 4:
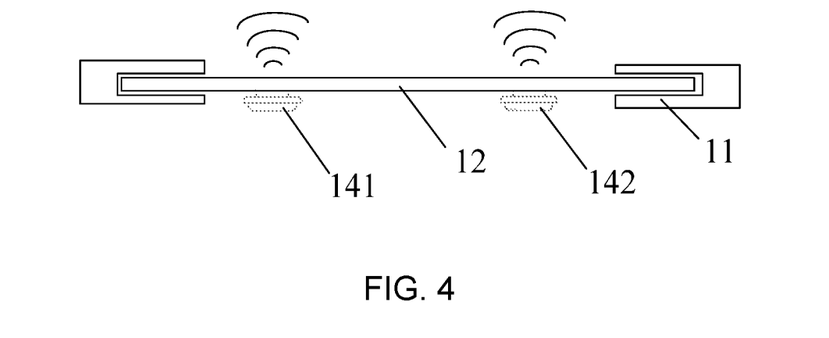
FIG. 4 is a schematic diagram of a sectional structure of another electronic device.

However, using the mounting manner for the electronic device as shown in FIG. 3 and FIG. 4 that the display screen 12 is simply wrapped around by the screen frame 11, a relative position between the display screen 12 and the screen frame 11 can be fixed; but for a large-size display screen, a sound-generating substrate thereof is required to have a relatively large rigidity (the sound-generating substrate being relatively hard and thick) to keep flat, while the sound-generating substrate with relatively large rigidity is disadvantageous for generating sound via the vibration.

On the other hand, the display screen having a sound-generating substrate with small rigidity (which is relatively soft and thin) is more likely to generate a flexural wave vibration, but the sound-generating substrate with small rigidity is likely to result in an irregular deformation of the display screen caused by a concavity and a convexity of the entire display screen, due to different thermal expansion coefficients of internal multilayer materials forming the sound-generating substrate, after the environment temperature change of the display screen. In this case, it is impossible to completely avoid the concave-convex deformation of the surface of the large-size display screen 12 merely by wrapping and mounting the display screen 12 by the screen frame 11, and the concave-convex deformation will further lead to a geometric distortion of the images displayed on the display screen.

Therefore, the present application provides an electronic device, where a tension is provided to the display screen by combining a bending structure of the display screen with a connection of a mounting structure, so as to solve the technical problem in the related art that the display screen, particularly the sound-generating display screen with ultra-short focus projection, is unable to keep flat, which leads to the image distortion.

The present application will be described below in detail in combination with the accompany drawings by way of the specific embodiments. Several specific embodiments below can combine with each other, and the same or similar concept or process will be omitted in some embodiments.

Figure 5:
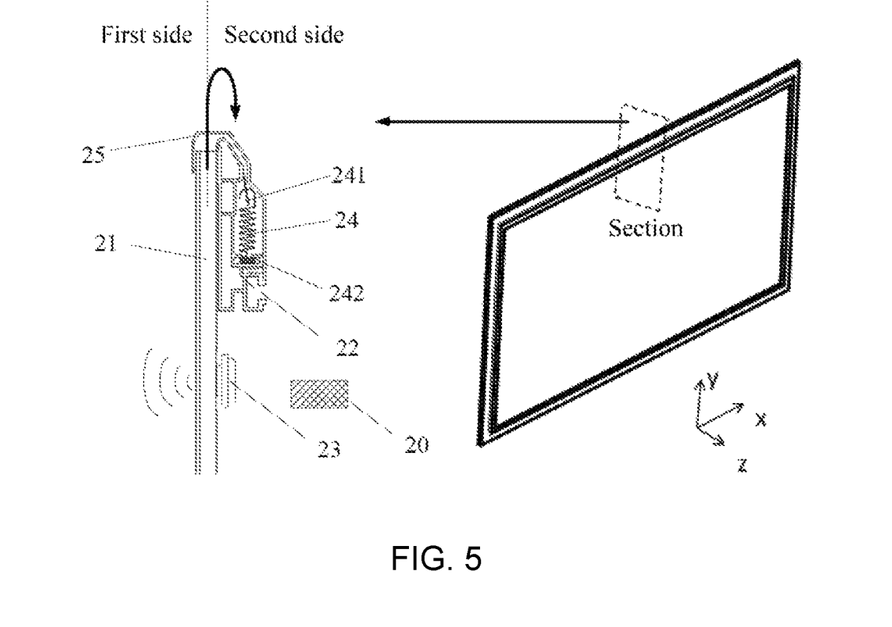
FIG. 5 is a schematic structural diagram of an electronic device of embodiment 1 according to the present application.

FIG. 5 is a schematic structural diagram of an electronic device of embodiment 1 according to the present application. The electronic device as shown in FIG. 5 may be an electronic device having a display screen, such as a television, a computer and the like. In an implementation, the television may be a laser projection television and the display screen thereof may be a laser projection screen.

FIG. 5 illustrates a schematic diagram of a section of the electronic device according to the present application, the section being perpendicular to the x direction in the figure after x, y and z coordinate axes are established. The electronic device includes: a host 20, a display screen 21, a screen frame 22, at least one electromagnetic driver 23 and at least one mounting structure 24.

The host 20 is an apparatus in the electronic device which is configured to provide sound signals and image signals. The host 20 may be disposed on a display side of the display screen 21, which is referred to as a first side; or, the host 20 may also be disposed on a non-display side of the display screen 21, i.e. a second side of the display screen 21 which is opposite to the first side. No limitation is made to the specific position and the arrangement manner of the host 20 in the present application.

Specifically, the host 20 can project light to the display screen 21, so after receiving the light projected from the host 20, the display screen 21 displays the content of images on the first side according to the light. In the laser projection television, the host 20 may be a laser projection host, and the light projected from the host 20 to the display screen 21 is laser.

Specifically, the host 20 can also send an electrical signal to the at least one electromagnetic driver 23 disposed on the second side of the display screen 21, in FIG. 5, an electromagnetic driver is shown for illustration. The at least one electromagnetic driver 23 disposed on the second side of the display screen is configured to generate an electromagnetic force independently or collectively according to the electrical signal after receiving the electrical signal sent from the host, so as to drive the display screen 21 to generate sound via vibration.

As an illustration, in embodiments of the present application below, remained structures excluding the host 20 are generally referred to as a display module. In other words, the electronic device includes two parts, i.e., the display module and the host. For the description of the related embodiments of the display module, reference is made to the related embodiments of the electronic device, which will not be repeated below.

In order to mount the display screen 21, the screen frame 22 is attached to edges of the second side of the display screen 21, and the shape of the screen frame 22 is adapted to the shape of the display screen 21 for supporting and protecting the display screen 21. And the screen frame 22 is merely disposed on the second side of the display screen 21, and the first side of the display screen 21 has no screen frame disposed thereon. For example, the rectangular display screen 21 in FIG. 5 is attached to the screen frame 22 which is also rectangle on the edges of the four corners around the second side.

In particular, in the electronic device according to the present application, in addition to being attached to the screen frame 22, the display screen 21 extends beyond the screen frame 22 and further extends toward the second side of the display screen 21. For example, in FIG. 5, the edges of the display screen 21 are attached to the screen frame 22, and the display screen 21 extends from the first side to the second side. For example, the display screen 21 is bended over from the first side to the second side, wherein the bending axis is the top of the screen frame 22.

In some embodiments, at least two opposite edges of the display screen 21 extend toward the second side of the display screen 21, so that a tension is provided to the display screen 21 via tensile forces of the two opposite edges, and the display screen 21 is kept flat between these two opposite edges. For example, in the coordinate system established in FIG. 5, two edges of the rectangular display screen 21 in the positive direction of x axis and the negative direction of x axis are opposite to each other, and the display screen 21 extends toward the second side at these two opposite edges to provide opposite tensile forces. Meanwhile, two edges of the rectangular display screen 21 in the positive direction of y axis and the negative direction of y axis are opposite to each other, and the display screen 21 extends toward the second side at these two opposite edges to provide opposite tensile forces as well. Or, the display screen of the electronic device as shown in FIG. 5 extends toward the second side on the above-described four edges which are opposite to each other two-by-two.

In some embodiments, it may be a part of the display screen that extends toward the second side, i.e. a manufacturer may make the size of the display screen 21 larger than the size of the screen frame 22 while manufacturing, so that the display screen 21 is able to extend beyond the screen frame 22 at the edges of four sides of the display screen 21 and further extend toward the second side of the display screen 21 by taking the screen frame 22 as the axis, after the display screen 21 is attached to the screen frame 22.

In some embodiments, after the display screen 21 of the electronic device according to the present application extends toward the second side, the tension is provided to the display screen by at least one mounting structure which is also disposed on the second side of the display screen 21. As shown in FIG. 5, a tension spring is taken as an example of the mounting structure for illustration. A first end 242 of the mounting structure 24 is connected with the screen frame, and a second end 241 is connected with the display screen 21 extending toward the second side. It can be understood that, in the example as shown in FIG. 5, when the rectangular display screen 21 extends toward the second side at four edges of the display screen 21, the second side at each edge has the at least one mounting structure 24 disposed thereon, thereby the tension in four directions of the positive direction of x axis, the negative direction of x axis, the positive direction of y axis and the negative direction of y axis is provided to the display screen 21 via the edges which are opposite to each other two-by-two.

For those reasons, in the electronic device according to embodiments of the present application, in addition to being attached to the screen frame, the display screen extends beyond the screen frame at at least two opposite edges and further extends toward the second side of the display screen by taking the screen frame as the axis, and then the display screen is attached to the screen frame via the mounting structure. In this way, tensile forces in opposite directions are provided to the display screen at at least two opposite edges via the mounting structure connected with the part that extends toward the second side, thereby the tension is provided to the surface of the display screen, and thus the display screen is kept flat by the tensile forces provided to the display screen via the mounting structure.

Especially for a sound-generating screen with ultrashort focus projection, the tension can be provided to the entire display screen, so as to avoid an irregular deformation of the display screen due to the concavity or the convexity of the entire display screen after an environment temperature change thanks to different thermal expansion coefficients of the multilayer materials thereof, thereby avoiding the geometric distortion of the images displayed on the display screen under the ultrashort focus projection.

Figure 6:
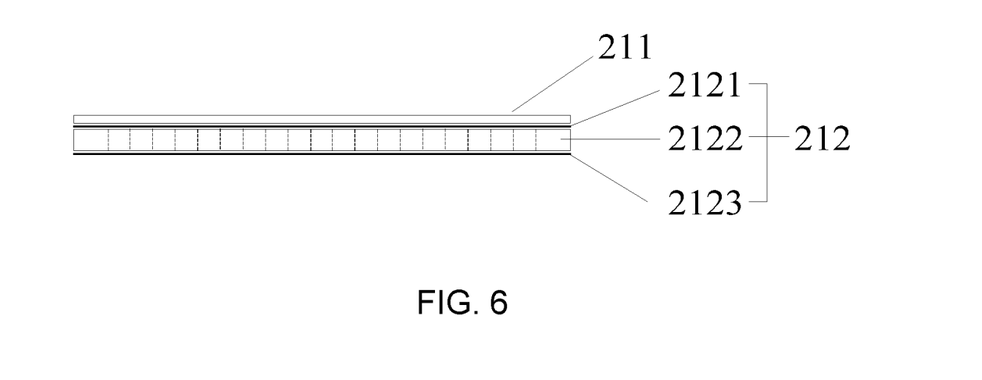
FIG. 6 is a schematic structural diagram of a laser projection screen.
Figure 7:
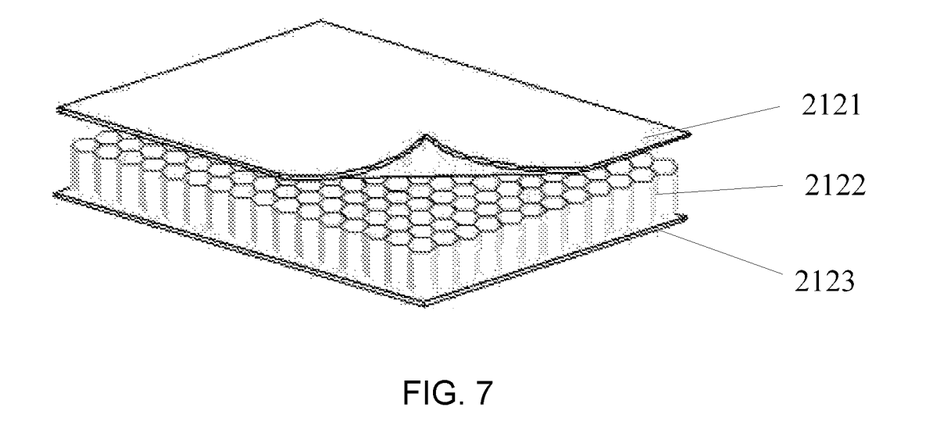
FIG. 7 is a schematic structural diagram of a sound-generating substrate of a laser projection screen.

In some embodiments, in the electronic device according to the present application, it may be the display screen itself or a part of the display screen that extends toward the second side and connects with the mounting structure. For example, FIG. 6 is a schematic structural diagram of a laser projection screen. When the display screen is a sound-generating laser projection screen, as shown in FIG. 6, the sound-generating laser projection screen includes: a sound-generating substrate 212 and a display structure 211, where a side of the sound-generating substrate 212 is attached to the display structure 211, and the at least one electromagnetic driver is disposed on the other side of the sound-generating substrate 212. More specifically, FIG. 7 is a schematic structural diagram of a sound-generating substrate of a laser projection screen. With reference to FIG. 6 and FIG. 7, the sound-generating substrate specifically includes: a first skin 2121, a middle layer 2122 and a second skin 2123. The first skin 2121 and the second skin 2123 are attached to two sides of the middle layer 2122, and the surface area of the first skin 2121, the surface area of the middle layer 2122 and the surface area of the second skin 2123 is the same. The middle layer may be formed by connecting a plurality of honeycomb cores which are arrayed in hexagons.

When the display screen as shown in FIG. 6 and FIG. 7 extends (for example, being bended over), merely one or two skins on the sound-generating substrate of the display screen may extend backward and connect with the mounting structure, and the tension to the entire display screen can be realized by the tensile force provided by the mounting structure to the skin(s). For example, in the example as shown in FIG. 5, if the display screen 21 is the laser projection screen as shown in FIG. 6 and FIG. 7, the second skin 2123 at the (four) edges of the second side of the display screen 21 is attached to the screen frame 22. And then, the second skin 2123 of the display screen 21 extends beyond the screen frame 22 and further extends toward the second side of the display screen 21 by taking the screen frame 22 as the axis. After extending toward the second side, the second skin 2123 is connected with the first end 241 of the mounting structure 24. In this case, since the second skin 2123, the middle layer 2122, the first skin 2121 and the display structure 211 are attached in order, the tensile force to the entire display screen can be realized via the tensile force of the mounting structure to the second skin 2123, and finally the tension to the entire display screen is realized via the tension forces of two opposite edges. In addition to attaching the second skin to the second side of the display screen, it may also be the first skin that extends toward the second side of the display screen, or it may also be the first skin and the second skin that collectively extend toward the second side of the display screen. The implementations and principles are similar and will not be repeated.

In some embodiments, the first skin 2121 and the second skin 2123 is made of polymer material, including but not limited to: polyurethane or polystyrene. Since the skins in the display screen of this embodiment are made of polymer material, the skins have a relatively high resilience, and thus can directly connect with the mounting structure, so that the mounting structure can provide the tensile force to the display screen directly via the skin(s) and protect the display screen from being damaged. Comparing with a display screen made of other materials in the related art, which cannot be directly acted on by the mounting structure, and therefore needs to add a protection apparatus for the display screen to provide the tensile force, structural complexity of the display screen of the present application is significantly reduced, and fabrication cost of the display screen is reduced; and the removing of the protection apparatus can save space for disposing other apparatuses of the electronic device, thereby also improving the space utilization of internal space of the electronic device.

Figure 8:
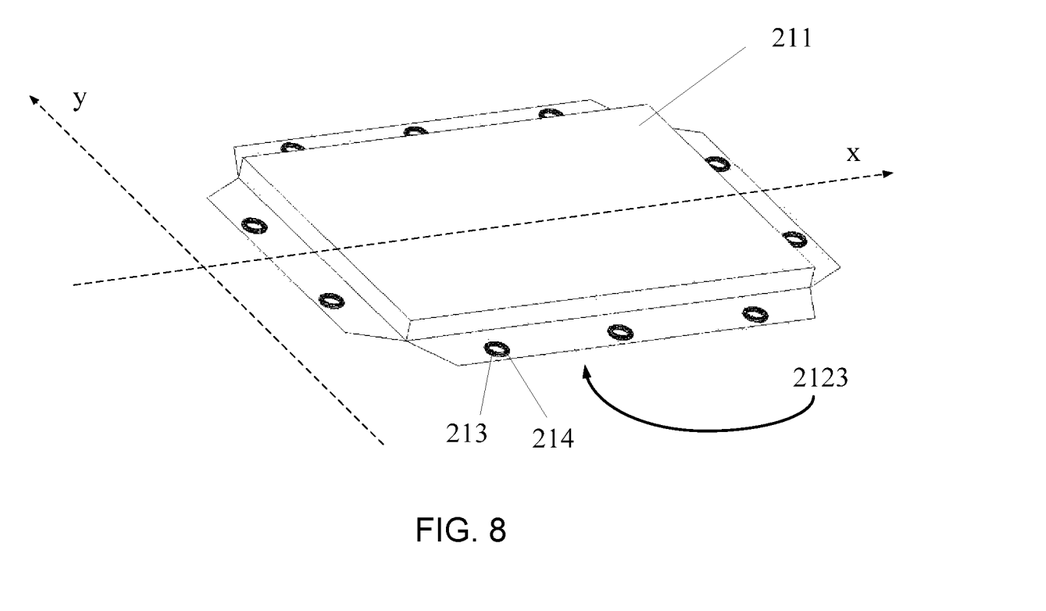
FIG. 8 is a schematic structural diagram of a skin of a display screen according to the present application.
Figure 9:
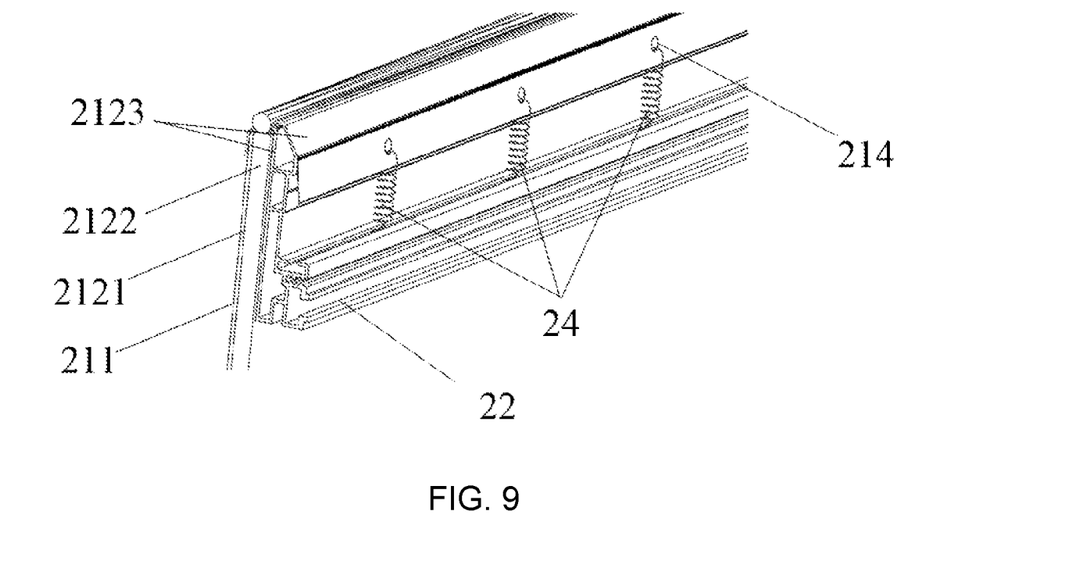
FIG. 9 is a schematic diagram of a connection of a mounting structure according to the present application.

FIG. 8 is a schematic structural diagram of a skin of a display screen according to the present application. As shown in FIG. 8, the size of the second skin 2123 is slightly larger than the size of the display structure 211; and each of the extensions of four edges has at least one opening 213 disposed thereon, and the opening has a hollow rivet 214 disposed thereon. The hollow rivet 214 is configured to make the mounting structure provide a relatively uniform tensile force to the second skin via the hollow rivet and further protect the structure of the display screen. Therefore, after the extension of the second skin 2123 as shown in FIG. 8 further extending toward the second side, the connection between the hollow rivet 214 disposed on the second skin 2123 and the mounting structure 24 is as shown in FIG. 9. FIG. 9 is a schematic diagram of a connection of a mounting structure according to the present application. A mounting structure 24 is disposed at each corresponding position of the hollow rivets 214 which are disposed on the second skin 2123 extending toward the second side. The first end of the mounting structure 24 is connected with the corresponding hollow rivet 214, and the second end is connected with the screen frame 22. All the mounting structures on one edge collectively provide the tensile force to the skin extending toward the second side at the same edge.

Figure 10:
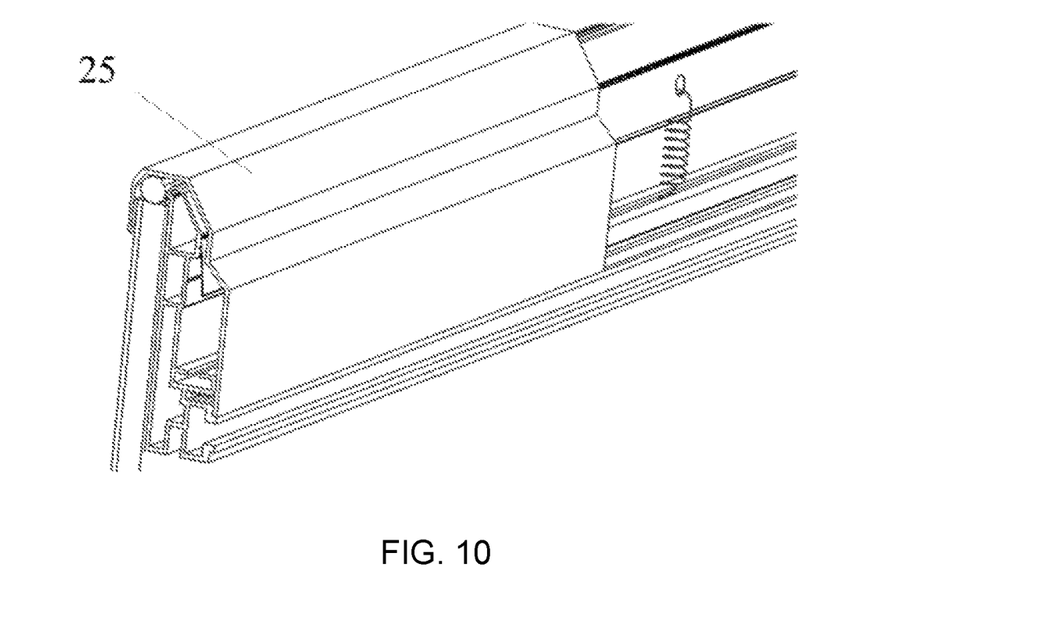
FIG. 10 is a schematic diagram of a wrapping structure of a display screen according to the present application.

In some embodiments, FIG. 10 is a schematic structural diagram of a wrapping structure of a display screen according to the present application. After the mounting of the skin of the electronic device is completed in the manner as shown in FIG. 9, each edge of the display screen of the electronic device is sheathed with an outer frame 25 as shown in FIG. 10 to protect the display screen and the mounting structure. In some embodiments, at the four edges of the above-described rectangular display screen, since the tension spring connected to the upper edge of the display screen needs to support the weight of the display screen in addition to providing the tensile force to the display screen, the elastic coefficient of the tension spring connected to the upper edge of the display screen is larger than the elastic coefficient of a tension spring connected to a lower edge of the display screen, so as to counteract the weight of the display screen held by the upper tension spring.

For those reasons, in the embodiments of the present application as shown in FIG. 5 to FIG. 10, the mounting configuration of the display screen in which the display screen extends toward the second side of the display screen and directly connects with the mounting structure is illustrated. While in other implementations, although it has a technical effect of simple structure and easy realization to simply enlarge the display screen for extending toward the second side for mounting, but in specific implementations, taking manufacture cost into consideration, the size of the display screen may be limited to be the same as that of the screen frame and an edge of the display screen may be extended by connecting a connection cloth. The display screen is "extended" by the connection cloth connected with the display screen, and thereby the connection cloth connected with the display screen extends toward the second side of the display screen and connects with the mounting structure, so that the mounting structure provides the tension to the display screen via the connection cloth.

Figure 11:
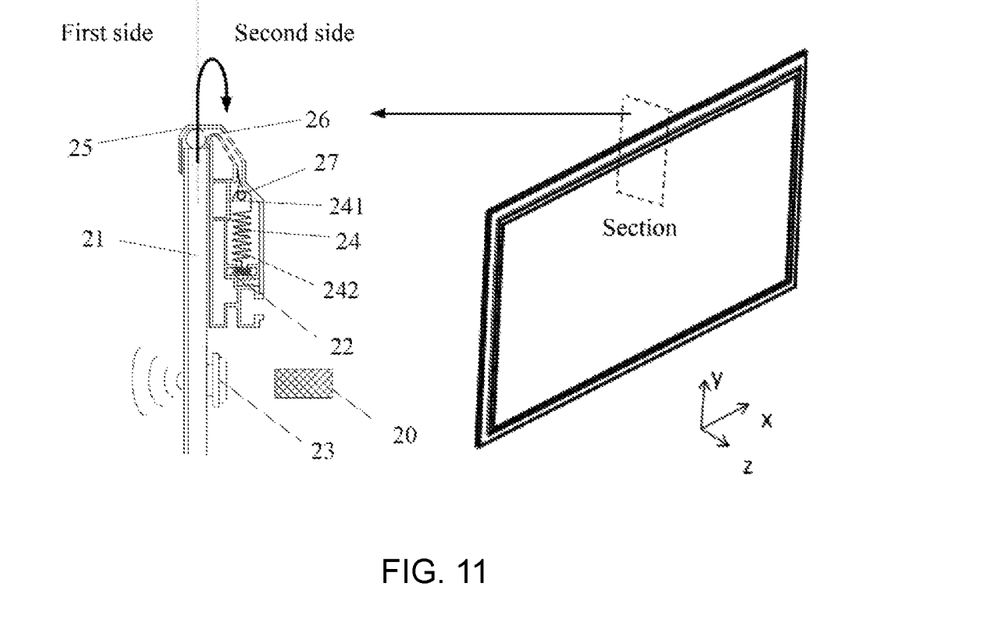
FIG. 11 is a schematic structural diagram of an electronic device of embodiment 2 according to the present application.

FIG. 11 is a schematic structural diagram of an electronic device of embodiment 2 according to the present application. The electronic device as shown in FIG. 11 includes: a host 20, a display screen 21, a screen frame 22, at least two connection cloths 26, support rods 27 having one-to-one correspondence with the connection cloths 26, at least one electromagnetic driver 23 and at least one mounting structure 24 corresponding to the support rod 27.

With respect to the description of the host 20, the display screen 21, the screen frame 22 and at least one electromagnetic driver 23, reference can be made to the embodiment as shown in FIG. 5, which will be omitted in this embodiment.

While in this embodiment, at least two opposite edges of the display screen are connected with the at least two connection cloths 26, through each of which a support rod 27 is threaded, thereby extending the display screen itself. In this case, the display screen may be regarded to include not only the display screen itself, but also all of the connection cloths 26.

For example, in the coordinate system established in FIG. 11, two edges of the rectangular display screen 21 in the positive direction of x axis and the negative direction of x axis are opposite to each other. Each of these two opposite edges of the display screen 21 is connected with a connection cloth 26, and each of the two connection cloths 26 connected with the opposite edges extends toward the second side of the display screen 21 after a support rod 27 is threaded therethrough. For example, the connection cloth 26 connected with the edge is bended over to the second side of the display screen 21 after the support rod 27 is threaded therethrough. Meanwhile, two edges of the rectangular display screen 21 in the positive direction of y axis and the negative direction of y axis are opposite to each other. Each of these two opposite edges of the display screen 21 is connected with a connection cloth 26, and each of the two connection cloths 26 connected with the opposite edges extends toward (e.g., being bended over to) the second side of the display screen 21 after a support rod 27 is threaded therethrough. Or, the above-described four edges of the display screen of the electronic device as shown in FIG. 11, which are opposite to each other two-by-two, are each connected with the connection cloth 26 which extends toward (e.g., being bended over to) the second side after the support rod 27 is threaded therethrough.

Figure 12:
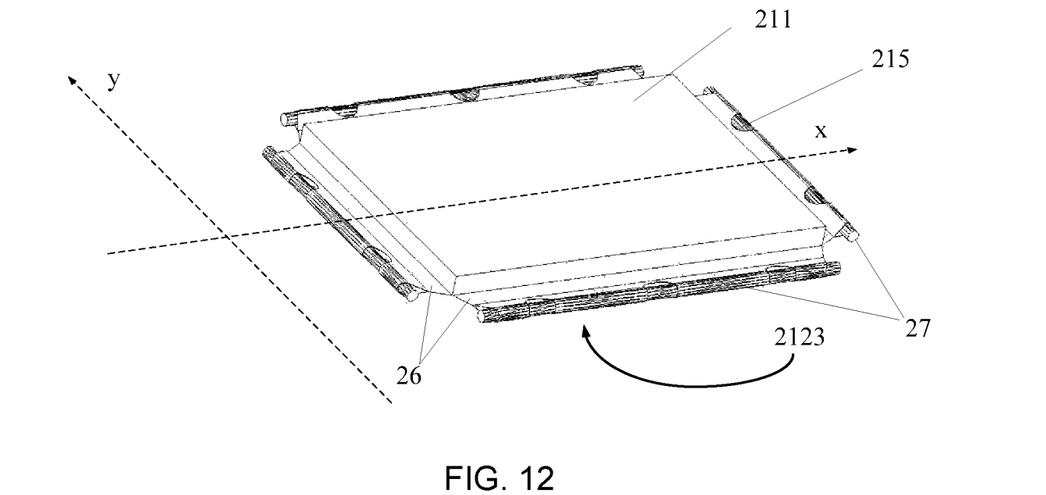
FIG. 12 is a schematic structural diagram of a skin of a display screen according to the present application.

In some embodiments, FIG. 12 is a schematic structural diagram of a skin of a display screen according to the present application. As shown in FIG. 12, each of the four edges of the second skin 2123 of the display screen 21 is connected with a connection cloth 26, which surrounds a support rod 27. Therefore, after the connection cloths 26 as shown in FIG. 12 surround the support rods 27 and extend toward the second side, the support rods 27 are connected with the at least one mounting structure 24 which is also disposed on the second side of the display screen 21. The at least one mounting structure 24 provides the tension to the display screen 21 via the support rods 27 and the connection cloths 26.

Figure 13:
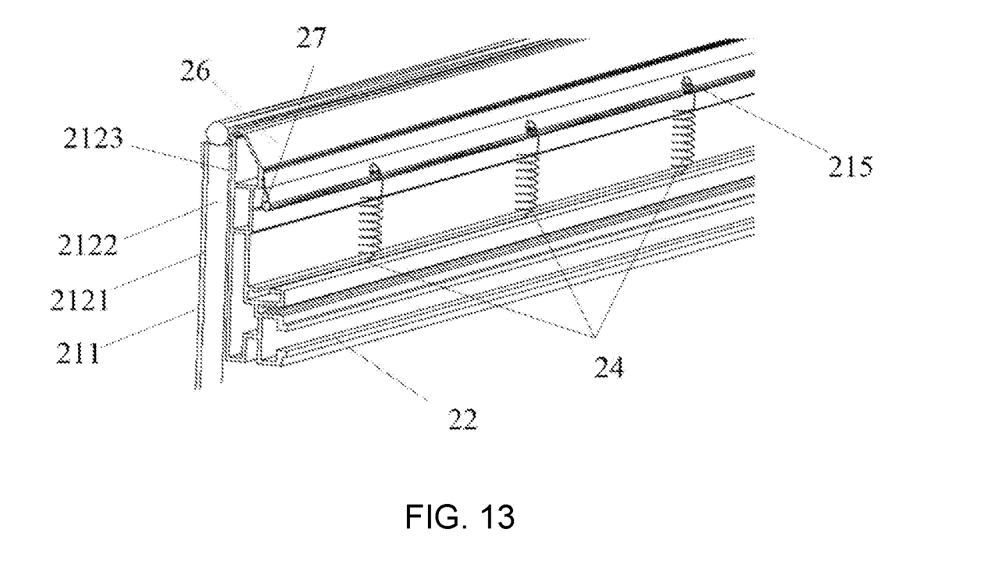
FIG. 13 is a schematic diagram of a connection of a mounting structure according to the present application.

The connection between the at least one mounting structure 24 and the support rod 27 is as shown in FIG. 13. FIG. 13 is a schematic diagram of a connection of a mounting structure according to the present application. An opening 215 is disposed on the connection cloth 26 extending toward the second side, which has one-to-one correspondence with the mounting structure, for receiving the second end of the mounting structure 24. In the example as shown in FIG. 13, a tension spring is taken as an example of the mounting structure 24 for illustration. The first end 242 of the mounting structure 24 is connected with the screen frame, and the second end 241 of the mounting structure 24 is connected with the support rod 27 via the corresponding openings. The at least one mounting structure 24 connected with the support rod 27 collectively provides the tensile force to the connection cloth 26 via the support rod 27, and the support rod 27 can make the tensile force provided by the at least one mounting structure 24 distribute uniformly on the entire connection cloth and protect the connection cloth from being damaged by directly pulling of the mounting structure 24. In this case, since the connection cloth 26 is connected with the second skin 2123, and the second skin 2123, the middle layer 2122, the first skin 2121 and the display structure 211 are attached in order, the tensile force to the entire display screen can be realized via the tensile force of the mounting structure to the connection cloth 26 via the support rod 27, and finally the tension to the entire display screen is realized via the tensile forces of the two opposite edges.

It can be understood that, in the example as shown in FIG. 11, when the four edges of the rectangular display screen 21 are connected with the connection cloths, through which the support rods are threaded, and the connection cloths extend toward the second side, and at least one mounting structure 24 is disposed on the second side of each of the four edges, each of the at least one mounting structure 24 disposed at the edge provides a tensile force to the connection cloth via the support rod, and thereby the tension in four directions of the positive direction of x axis, the negative direction of x axis, the positive direction of y axis and the negative direction of y axis is provided to the display screen 21 via the connection cloths at the edges which are opposite to each other two-by-two.

Figure 14:
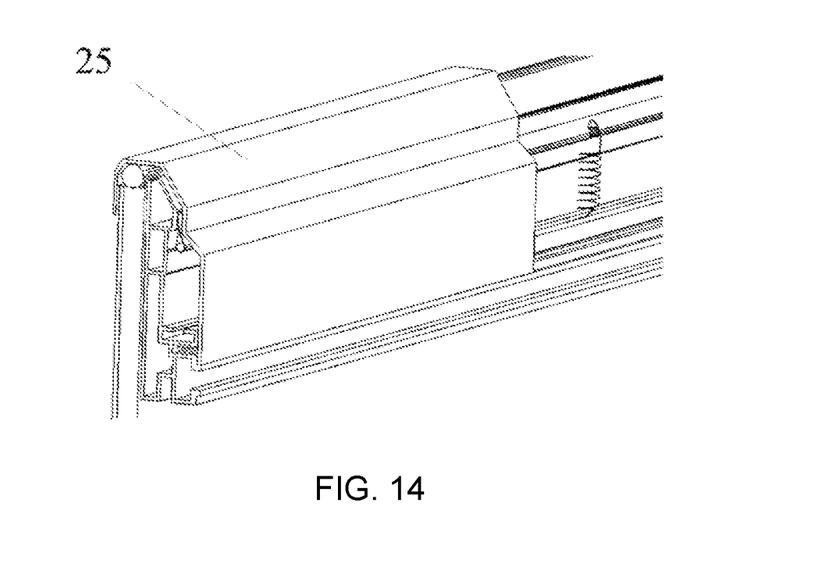
FIG. 14 is a schematic diagram of a wrapping structure of a display screen according to the present application.

In some embodiments, FIG. 14 is a schematic diagram of a wrapping structure of a display screen according to the present application. After the skins of the electronic device are mounted in the manner as shown in FIG. 13, each edge of the display screen of the electronic device is sheathed with an outer frame 25 as shown in FIG. 14 to protect the display screen and the mounting structure.

In some embodiments, at the four edges of the above-described rectangular display screen, since a tension spring connected to an upper edge of the display screen needs to support the weight of the display screen in addition to providing the tensile force to the display screen, the elastic coefficient of the tension spring connected to the upper edge of the display screen is larger than the elastic coefficient of a tension spring connected to a lower edge of the display screen, so as to counteract the weight of the display screen held by the upper tension spring.

For those reasons, in the electronic device according to the embodiments of the present application, in addition to being attached to the screen frame, the display screen is further connected with the connection cloths, through which the support rods are threaded, at at least two opposite edges, and after the connection cloths extend toward the second side of the display screen by taking the screen frame as the axis, the support rods are fixed by the mounting structure connected with the screen frame. In this way, the tensile forces in opposite directions are provided to the display screen at at least two opposite edges via the connection cloths extending toward the second side, thereby the tension is provided to the surface of the first side of the display screen, and thus the display screen is kept flat by the tensile forces provided via the mounting structure to the display screen.

Especially for the sound-generating screen with ultrashort focus projection, the tension is provided to the entire display screen, so as to avoid an irregular deformation of the electronic device caused by the concavity or the convexity of the entire display screen after an environment temperature change due to different thermal expansion coefficients of the multilayer materials thereof, thereby avoiding the geometric distortion of the images displayed on the display screen.

Embodiments of the present application also provide a laser television, including: a box, configured to send projection light; a display screen, configured to receive the projection light and display an image on the display screen; and at least one electromagnetic driver, configured to drive the display screen to generate sound via vibration. The box is a kind of the host as described above, and the reference can be made to the above description.

In some embodiments, the laser television further includes: a screen frame, disposed on edges of the display screen, and configured to hold the display screen; and at least one mounting structure, having a first end connected with the screen frame and a second end extending toward the display screen, and configured to keep the display screen flat.

In some embodiments, a first side of the display screen is configured to display an image, and the display screen extends beyond the screen frame at at least two opposite edges and extends toward a second side of the display screen; and the at least one mounting structure is disposed on the second side of the display screen.

In some embodiments, the mounting structure is specifically configured to keep the display screen flat by providing a tension to the display screen.

In some embodiments, the display screen includes: a sound-generating substrate and a display structure, where the sound-generating substrate is attached to the display structure, and the at least one electromagnetic driver is disposed on a side of the sound-generating substrate; the sound-generating substrate includes: a first skin, a second skin and a middle layer, where the first skin and the second skin are attached to two sides of the middle layer, respectively.

In some embodiments, the first skin and/or the second skin of the sound-generating substrate extends beyond the screen frame at at least two opposite edges and extends toward the second side of the display screen; the second end of the mounting structure is connected with the first skin and/or the second skin of the sound-generating substrate extending toward the second side.

In some embodiments, at least one opening is disposed on the first skin and/or the second skin of the sound-generating substrate extending toward the second side, and the at least one opening has one-to-one correspondence with the at least one mounting structure; a hollow rivet is disposed on the opening, and the second end of the at least one mounting structure is connected with the hollow rivet disposed on the at least one opening.

In some embodiments, the mounting structure includes: a tension spring. The elastic coefficient of a tension spring connected to an upper edge of the display screen is larger than the elastic coefficient of a tension spring connected to a lower edge of the display screen.

For the related description of the above-described laser television, reference can be made to the description of the above electronic device, which will be omitted here.

Finally, it should be noted that the above-described embodiments are merely illustrative embodiments of the present application, and shall not construe as limiting the present application. Although the present application is illustrated in detail with reference to the foregoing various embodiments, those skilled in the art should understand that, modifications may still be made to the forgoing embodiments, or equivalents may still be made to a part or all of the technical features therein; while these modifications or equivalents do not make the essence of the corresponding embodiments depart from the scope of the embodiments of the present application.

What is claimed is:

1. An electronic device, comprising:
 a host, configured to project light to a display screen and send an electrical signal to at least one electromagnetic driver;
 the display screen, configured to receive the light projected from the host and display an image on a first side of the display screen according to the light;
 the at least one electromagnetic driver, disposed on a second side of the display screen, and configured to receive the electrical signal sent from the host and drive the display screen to generate sound via vibration according to the electrical signal;
 a screen frame, attached to edges of the second side of the display screen, and configured to hold the display screen, wherein the display screen extends beyond the screen frame at at least two opposite edges and extends toward the second side of the display screen; and
 at least one mounting structure, disposed on the second side of the display screen; wherein the mounting structure has a first end connected with the screen frame and a second end connected with the display screen extending toward the second side, and is configured to keep the display screen flat;

wherein the mounting structure is configured to keep the display screen flat by providing a tension to the display screen;

wherein the display screen includes: a sound-generating substrate and a display structure, wherein the sound-generating substrate is attached to the display structure, and the at least one electromagnetic driver is disposed on one side of the sound-generating substrate;

the sound-generating substrate includes: a first skin, a second skin and a middle layer; wherein the first skin and the second skin are attached to two sides of the middle layer, respectively;

the first skin and/or the second skin of the sound-generating substrate extend beyond the screen frame at at least two opposite edges and extend toward the second side of the display screen; the second end of the mounting structure is connected with the first skin and/or the second skin of the sound-generating substrate extending toward the second side;

wherein the first skin and the second skin are made of polymer material, wherein the polymer material includes: polyurethane or polystyrene.

2. The electronic device according to claim 1, wherein,
at least one opening is disposed on the first skin and/or the second skin of the sound-generating substrate extending toward the second side, and the at least one opening has one-to-one correspondence with the at least one mounting structure;

a hollow rivet is disposed on one of the at least one opening, and the second end of the at least one mounting structure is connected with the hollow rivet disposed on one of the at least one opening.

3. The electronic device according to claim 1, wherein the mounting structure includes: a tension spring.

4. The electronic device according to claim 3, wherein,
an elastic coefficient of a tension spring connected to an upper edge of the display screen is larger than an elastic coefficient of a tension spring connected to a lower edge of the display screen.

5. The electronic device according to claim 1, further comprising:
at least two connection cloths, in connection with the at least two opposite edges of the display screen accordingly;

wherein the display screen extends beyond the screen frame at the at least two opposite edges and extends toward the second side of the display screen, via the at least two connection cloths which have one-to-one correspondence with the at least two opposite edges.

6. The electronic device according to claim 5, further comprising:
at least one supporting rod which has one-to-one correspondence with the at least two connection cloths, wherein corresponding supporting rods are threaded through the at least two connection cloths, respectively, when extending toward the second side of the display screen;

the at least one mounting structure includes: at least one mounting structure corresponding to the at least one supporting rod; the first end of the at least one mounting structure corresponding to the at least one supporting rod is connected with the screen frame, and the second end is connected with one of the at least one supporting rod; the at least one mounting structure corresponding to the at least one supporting rod is configured to keep the display screen flat by providing a tension to the display screen via the at least one supporting rod.

7. A laser television, comprising:
a box, configured to send projection light;
a display screen, configured to receive the projection light and display an image on the display screen;
at least one electromagnetic driver, configured to drive the display screen to generate sound via vibration;
a screen frame, disposed on edges of the display screen, and configured to hold the display screen; and
at least one mounting structure, having a first end connected with the screen frame and a second end connected with the display screen that extends, and configured to keep the display screen flat;

wherein the mounting structure is configured to keep the display screen flat by providing a tension to the display screen;

wherein the display screen includes: a sound-generating substrate and a display structure, wherein the sound-generating substrate is attached to the display structure, and the at least one electromagnetic driver is disposed on one side of the sound-generating substrate;

the sound-generating substrate includes: a first skin, a second skin and a middle layer;

wherein the first skin and the second skin are attached to two sides of the middle layer, respectively;

wherein the first skin and/or the second skin of the sound-generating substrate extend beyond the screen frame at at least two opposite edges and extend toward the second side of the display screen; the second end of the mounting structure is connected with the first skin and/or the second skin of the sound-generating substrate extending toward the second side;

wherein at least one opening is disposed on the first skin and/or the second skin of the sound-generating substrate extending toward the second side, and the at least one opening has one-to-one correspondence with the at least one mounting structure;

a hollow rivet is disposed on one of the at least one opening, and the second end of the at least one mounting structure is connected with the hollow rivet disposed on one of the at least one opening.

8. The laser television according to claim 7, wherein a first side of the display screen is configured to display the image, and the display screen extends beyond the screen frame at at least two opposite edges and extends toward a second side of the display screen; and the at least one mounting structure is disposed on the second side of the display screen.

9. The laser television according to claim 7, wherein the mounting structure includes: a tension spring, and an elastic coefficient of a tension spring connected to an upper edge of the display screen is larger than an elastic coefficient of a tension spring connected to a lower edge of the display screen.

* * * * *